Jan. 9, 1951  F. W. EDWARDS  2,537,335
ACCESSORY DRIVE AND COUPLING
Filed July 24, 1944
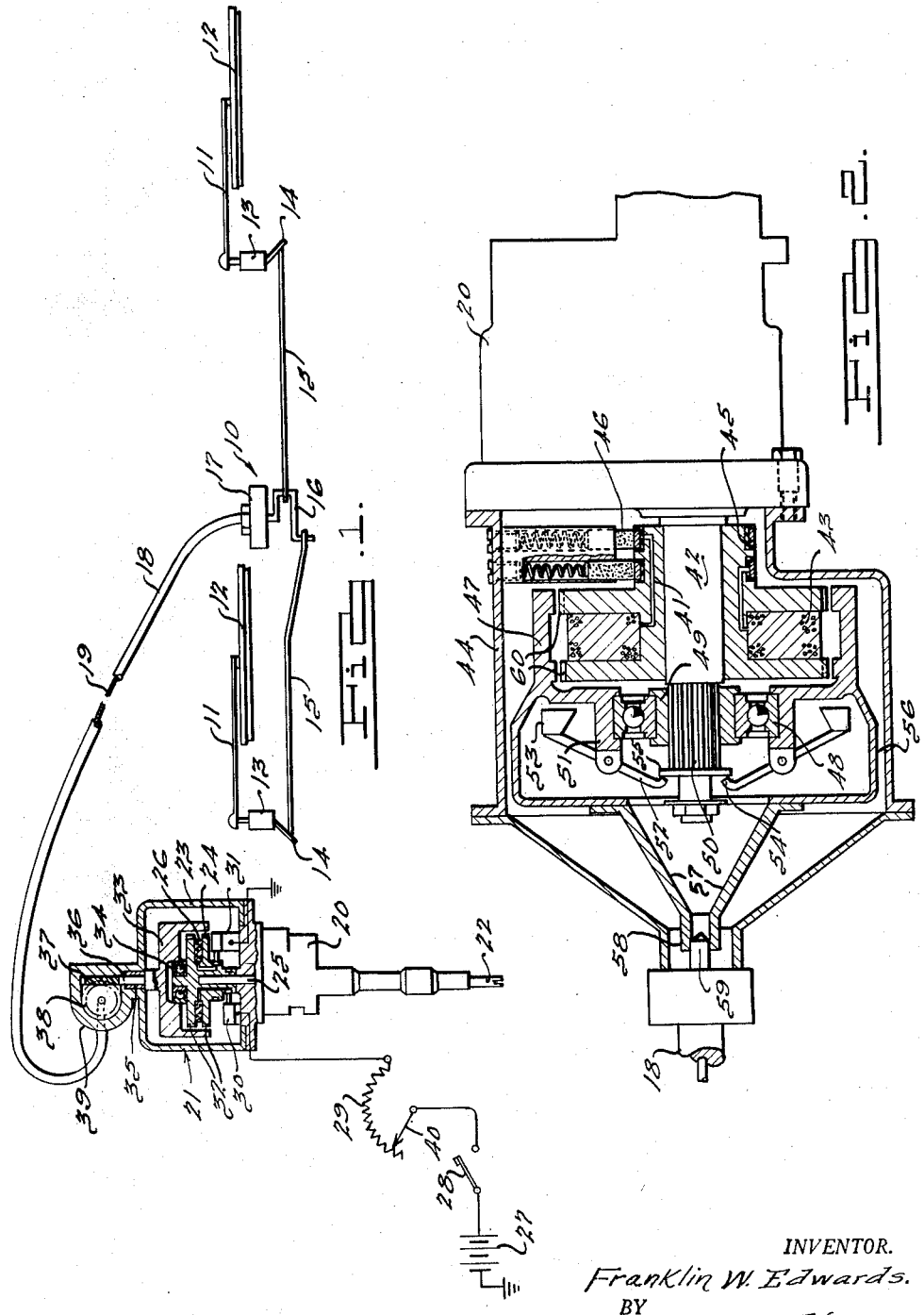
INVENTOR.
Franklin W. Edwards.
BY
Harness & Harris
ATTORNEYS Patented Jan. 9, 1951

2,537,335

UNITED STATES PATENT OFFICE 2,537,335

ACCESSORY DRIVE AND COUPLING

Franklin W. Edwards, Detroit, Mich., assignor to Chrysler Corporation, Highland Park, Mich., a corporation of Delaware Application July 24, 1944, Serial No. 546,405

3 Claims. (Cl. 172—284)

1

This invention relates to windshield wipers.

More particularly, it relates to an improved means for driving windshield wipers directly from the engine of a motor vehicle, boat, or the like.

The deficiencies of windshield wiper drives now in use are well known. Those actuated by intake manifold vacuum vary in speed with the throttle opening and load and frequently stop when they are needed most. Those driven by electrical motors are noisy and cause severe drain on the battery.

Various attempts have been made to drive the wiper arms directly from the engine through a flexible cable and some sort of power take-off. These have, in general, been unsuccessful because the wiper arms were driven too fast at high vehicle speeds and too slow at slow vehicle speeds, and breakage of the drive cable was frequent because of shock loads on the blades caused by dry glass, ice, etc.

Accordingly, it is the prime object of my invention to provide an improved drive means for the windshield wiper blades that overcomes and avoids the aforesaid difficulties.

Another object is to provide a wiper drive that is substantially constant in speed regardless of engine speed.

Still another object is to provide in the wiper drive mechanism means for absorbing shocks caused by sudden changes in load on the wiper blades.

Further objects and advantages will be apparent from the following specification wherein I have described preferred embodiments of my invention.

In the drawings which accompany the specification,

Fig. 1 is a diagrammatic view of the complete wiper system, certain parts being shown in section to illustrate details thereof.

Fig. 2 is a sectional view of a modified form of coupling means, and Fig. 3 is another modification of the invention.

Referring to Fig. 1, it will be seen that I have shown a wiper mechanism 10 which comprises a pair of wiper arms 11 which respectively carry blades 12 having the usual flexible squeegee portions for wiping the surface of a windshield (not shown).

The arms 11 are mounted at one end in a bearing mount 13 which is adapted to be secured to the windshield frame. A pair of cranks 14 are connected with a central crank 16 by links 15, the crank 16 being mounted in a fitting 17 disposed centrally of the windshield frame. The crank 16 is rotated by a flexible drive cable 18 of standard type. The mechanism just described is more or less conventional and has not been shown in detail, it being understood that rotation of the inner element 19 of cable 18 will rotate crank 16 and this rotary motion, through the intermediary of the links 15 and cranks 14, will be translated into oscillatory motion on the arms 11.

In the present instance, the wipers are driven directly from the regular engine oil pump 20 through an eddy-current coupling 21. This is for convenience, it being understood that the eddy-current coupling could as well be mounted on and/or driven by the generator, fuel pump, fan, or other accessory.

The oil pump 20 is driven from the cam shaft or other rotating part of the engine through a shaft 22, the speed thereof varying in accordance with the speed of the engine.

The eddy-current coupling consists essentially of a casing 23 in which is rotatably mounted a driving member 24. The member 24 is carried by a shaft 25 which is driven from the oil pump 20 at the speed thereof. The member 24 carries a field coil 26 which is energized from the regular vehicle battery 27 through a switch 28 and a variable resistance 29. A pair of brushes 30—31, contact corresponding slip rings as shown to energize the coil 26 and still permit rotation of member 24. The latter is provided with peripheral teeth 32.

Surrounding the driving member 24 is the driven member of the coupling 33 which is supported for rotation relative to the member 24 and the casing 23 by a bearing 34 and a bushing 35. A shaft 36, formed integral with the member 33 has worm teeth 37 cut in its outer end, which mesh with a worm wheel 38 mounted in the casing portion 39.

The worm wheel is directly connected to the inner driving element 19 of the cable 18.

When the field coil 26 is energized and the member 24 rotated, magnetic flux will surround the coil and will travel across the air gap between members 24 and 33 where it will produce regions of alternating high and low flux density in the member 33 causing eddy currents to flow therein. A magnetic effect is thus produced which causes the driven member 33 to follow the driving member 24 and to try and catch up with it and rotate in unison therewith.

There is inherent slip between the coupling members 24 and 33 due to the characteristics of such devices and this slip may be varied in accordance with the excitation of the field. The drive member 24 is preferably driven at all times that the engine is operating and the wipers may be started by swinging the arm 40 to energize the coil 26.

The switch 28 is preferably the ignition switch of the engine and when it is closed and the engine is running, swinging of the arm 40 clockwise will energize the field coil 26. The speed of the wiper blades 12 may be varied by the driver to suit different weather conditions, but once the arm 40 is set in a selected position, the speed of the coupling driven member 33 (and that of the blades 12) will remain substantially constant regardless of engine speed. This is due to the inherent characteristic of the eddy current coupling which may be designed to provide desired speed characteristics.

In installations where extremely good speed regulation is desired and/or where the engine speed varies between wide limits, some form of automatically operable speed governing device on the coupling is desirable.

Fig. 2 shows an eddy-current coupling which may be substituted bodily for the coupling 21 in the Fig. 1 apparatus. The Fig. 2 coupling comprises a driving member 41 having a drive shaft 42. The member 41 carries a field coil 43 and is driven from the oil pump 20 as is the case in Fig. 1. A casing 44 bolted to the pump casing encloses the coupling mechanism and supports the end of the flexible cable 18. The coil 43 is supplied with current through slip rings 45 and brushes 46. The driven member 47 of the coupling is supported by a ball bearing 48 which may be of the double row type or of the needle type if required for greater stability. The inner race of the bearing is carried by a bushing 49 which is internally splined and which slides on splines 50 of shaft 42. The bearing outer race supports the hub portion 51 of the driven member 47 and is fixed thereto.

Pivotally mounted on the portion 51 are a plurality of levers 52 having weights 53 on their outer ends. The inner ends of the levers 52 are provided with bearing surfaces 54 which bear on one surface of a collar 55 carried by shaft 42. The driving connection between the cable 18 and member 47 comprises a cage 56 which carries a conical part 57 having a cylindrical squared (or splined) portion 58 which has a sliding connection with the end lug 59 of the cable.

When the coil 43 is energized, flux travels around the coil and passes through the teeth 60 across the air gap and through that part of the member 47 which radially overlies the teeth. When driving member 41 is rotated, regions of alternate high and low density flux are produced in member 47 and the latter tends to follow the member 41 through magnetic attraction.

The Fig. 2 coupling is preferably designed to have a predetermined slip curve at constant load as the speed of the driving means varies. A decrease in output torque tends to reduce the slip between the members 41 and 47 and results in an increase in the speed of 47. Any increase in the speed of 47 causes the weights 53 to move radially outwardly because of the increased centrifugal force and such action reacts through the levers 52 against the axially fixed collar 55 and pulls the driven member 47 axially toward the left as is permitted by the splines 50. This displacement of the member 47 reduces the flux path area, or in other words, lengthens the air gap between the teeth 60 and the inner surface of member 47, which results in increased slip between the members. Magnetic action across the teeth will restore the members to radially aligned position when centrifugal force on weights 53 is decreased.

During operation of the coupling at varying engine speeds, the centrifugal force on weights 53 will maintain the weights in such positions that the speed of the driven coupling member 47 will remain constant.

An important feature of my improved wiper drive resides in the shock absorbing characteristics of the eddy-current coupling, which will slip under sudden increased load and relieve the cable and gears of shock which might cause breakage.

Thus it may be seen that I have provided an improved windshield wiper mechanism characterized by an improved driving means which is positive and steady under all conditions of operation, is economical of electric current, shock-proof and simple in construction.

The embodiments shown and described for illustrative purposes may be changed and rearranged by those skilled in the art to suit different conditions, it being understood that my invention is intended to be limited only as set forth in the claims appended below.

I claim:

1. An eddy-current coupling for providing a constant speed output when connected to a variable speed input, comprising, an input member having a mounting shaft; a field coil in said input member; a splined extension on said shaft; a bushing slidable on said splined extension; an anti-friction bearing carried by said bushing; an output member carried by said bearing and having a portion extending in surrounding relation with the input member; a plurality of weighted levers pivotally mounted on said output member, said levers bearing at their radial inner ends on an axially fixed portion of the assembly whereby increase in speed of said output member above a predetermined speed will cause said levers to move said output member axially on said splined extension.

2. An eddy-current coupling for providing a constant speed output when connected to a variable speed input, comprising an input member, a bushing mounted on said input member for slidable movement relative thereto, an anti-friction bearing carried by said bushing, an output member carried by said bearing and having a portion extending in surrounding relation with the input member, a field coil on one of said members, a plurality of weighted levers pivotally mounted on said output member, said levers bearing at their radial inner ends on an axially fixed portion of the coupling whereby increase in speed of said output member above a predetermined speed will cause said levers to slide said output member axially relative to said input member.

3. An eddy-current coupling for providing a constant speed output when connected to a variable speed input, comprising a driving member, a driven member, a bushing mounted on a first one of said members for slidable movement relative thereto, an anti-friction bearing carried by said bushing, the second of said members being carried by said bearing and having a portion extending in surrounding relation with said first member, a field coil on one of said members, a plurality of weighted levers pivotally mounted on said second member, said levers bearing at their radial inner ends on an axially fixed portion of the coupling whereby increase in speed of said second member above a predetermined speed will cause said levers to slide said second member axially relative to said first member.

FRANKLIN W. EDWARDS.

REFERENCES CITED

The following references are of record in the file of this patent:

UNITED STATES PATENTS

| Number | Name | Date |
| --- | --- | --- |
| 1,553,621 | Locklin | Sept. 15, 1925 |
| 1,747,284 | Berill | Feb. 18, 1930 |
| 1,887,284 | Brady | Nov. 8, 1932 |
| 2,053,860 | Whitted | Sept. 8, 1936 |
| 2,109,701 | Jordan | Mar. 1, 1938 |
| 2,125,505 | Kritz | Aug. 2, 1938 |
| 2,191,356 | Snell | Feb. 20, 1940 |
| 2,193,214 | Winther et al. | Mar. 12, 1940 |
| 2,233,815 | Horton | Mar. 4, 1941 |
| 2,243,016 | Pritchard et al. | May 20, 1941 |
| 2,280,736 | Winther | Apr. 21, 1942 |
| 2,374,028 | Martin | Apr. 17, 1945 |